(No Model.)

D. N. GLEASON.
PIPE COUPLING.

No. 579,643. Patented Mar. 30, 1897.

WITNESSES:

INVENTOR
Duane N. Gleason

BY
ATTORNEY

UNITED STATES PATENT OFFICE.

DUANE N. GLEASON, OF BROOKLYN, NEW YORK.

PIPE-COUPLING.

SPECIFICATION forming part of Letters Patent No. 579,643, dated March 30, 1897.

Application filed February 24, 1896. Serial No. 580,334. (No model.)

*To all whom it may concern:*

Be it known that I, DUANE N. GLEASON, a citizen of the United States, residing at Brooklyn, Kings county, New York, have invented certain new and useful Improvements in Pipe-Couplings, of which the following is a specification.

My invention relates to that class of couplings wherein a washer or packing is employed in making a tight joint, and is intended to apply more particularly to joints which have to resist more or less pressure from steam, water, or other fluids.

The particulars of my improvement are hereinafter more fully set forth.

Figure 1:
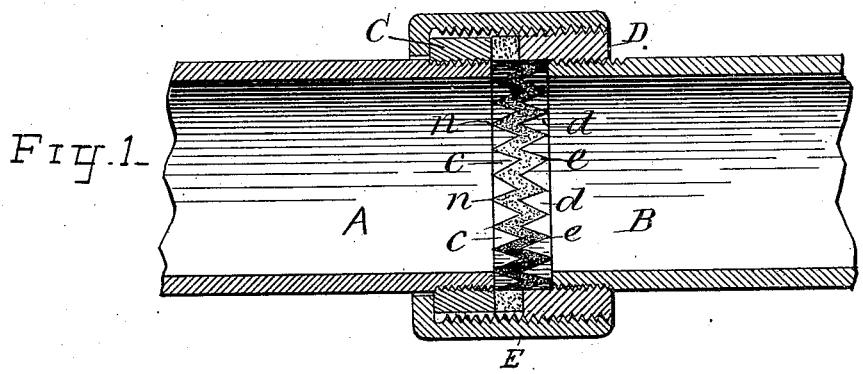
Figure 2:
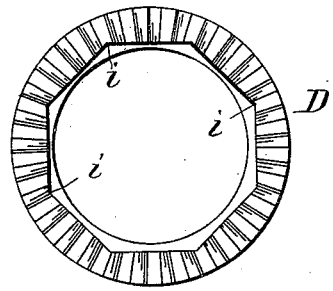
Figure 3:
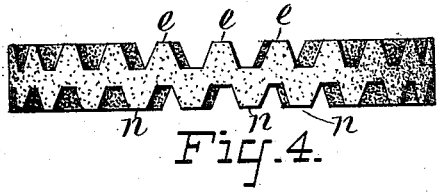
Figure 4:
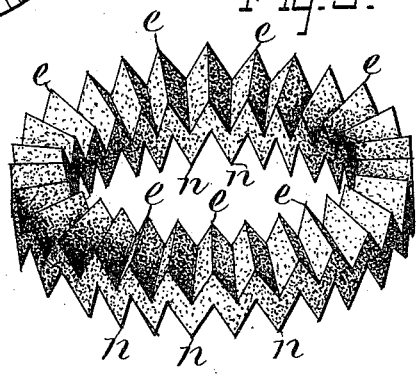

In the drawings, Figure 1 is a longitudinal sectional view showing two pipes connected by my coupling. Fig. 2 is a top view of the collar D. Fig. 3 is a view of my improved washer, and Fig. 4 shows a modification of the same.

Similar letters designate similar parts in all the figures.

A and B indicate the two pipes to be joined by the coupling. Upon the end of the pipe A is threaded a collar C, which has an indented edge $c\ c$ projecting beyond the end of the pipe A. The collar D is similarly threaded upon the pipe B and is also provided with a thread upon its outer surface. This collar D has an indented edge $d\ d$ projecting beyond the end of the pipe B, and this projecting portion is provided with a polygonal rabbet $i\ i\ i$ to receive a wrench of corresponding outline, whereby the collar can be run upon the pipe B without grasping it upon the outside with a pipe-wrench and marring the exterior thread.

The packing or washer F is formed of lead or other suitable material and is provided with the indented edges $e\ e\ e$ and $n\ n\ n$, which are adapted to match with indented edges of the collars C and D. The indentations upon the opposite sides of the packing F intermit, as shown, so that a nearly uniform thickness of material is maintained all around the packing.

A modification of the form of packing is shown in Fig. 4, where the indentations are of a somewhat different form. It will be understood that to use such a form of packing the indentations in the edges of the collars C and D must be changed to correspond.

In using my coupling the coupler E is first slid upon the pipe A. The collars C and D are then run upon their respective pipes and the packing F is inserted between the edges of the collars. The coupler E is then slid forward over the collar C and packing F and screwed firmly upon the collar D, drawing the members of the coupling firmly together and forcing the teeth on the collars C and D to firmly embed themselves in the indentations in the packing F, thus making a very close and secure joint. The teeth on the collars C and D entering the indentations in the packing F, the pipes are prevented from changing their relative positions by rotation while the coupling is being screwed tight. This prevents the loosening of joints that may have been made at the other ends of the pipes and insures the pipes retaining the relative position which they are given when the tightening of the coupling is begun.

Having thus described my invention, what I claim, and desire to secure by Letters Patent of the United States, is—

1. The combination, between the members of a coupling, of a packing provided with radial angular indentations, alternating upon the opposite sides of the packing, and forming a series of angular-edged radial teeth on each side of said packing, substantially as described.

2. The combination of the pipes to be coupled, each provided upon its end with radial angular indentations forming between them angular-edged teeth, the teeth on one pipe corresponding to the indentations on the other pipe, a packing provided with radial indentations of the same form as the teeth of the pipe ends, said indentations alternating upon opposite sides of said packing, and a coupling to join the ends of the pipes, substantially as described.

3. The combination with the pipes to be coupled of a collar, threaded upon the end of one of said pipes, and provided with a toothed edge, a collar threaded upon the end of the other pipe and provided with a toothed edge, a polygonal rabbet within such edge and an exterior thread, a packing provided with indentations corresponding with the teeth upon the aforesaid collar, and inserted between them, and a coupler-sleeve provided with a flange to embrace the first-mentioned collar and an interior thread to engage the exterior thread upon the other collar, substantially as and for the purposes set forth.

DUANE N. GLEASON.

Witnesses:
OSCAR E. HAWXHURST,
WM. D. NEILLEY.